United States Patent [19]
Seeley et al.

[11] Patent Number: 5,240,222
[45] Date of Patent: Aug. 31, 1993

[54] SECONDARY VIBRATION ISOLATION SYSTEM

[75] Inventors: Dale F. Seeley, Champlin; Stephen M. Clancey, Mounds View; Gary A. Salmonson, St. Cloud; Keith Ewer, Champlin; Mark S. Lent, Brooklyn Park, all of Minn.

[73] Assignee: ONAN Corporation, Minneapolis, Minn.

[21] Appl. No.: 851,175

[22] Filed: Mar. 13, 1992

[51] Int. Cl.⁵ .............................................. F16M 1/00
[52] U.S. Cl. .................................. 248/638; 248/610; 248/635
[58] Field of Search ............... 248/638, 635, 634, 610, 248/611, 612, 560, 632

[56] References Cited

U.S. PATENT DOCUMENTS

| | | |
|---|---|---|
| 1,139,158 | 5/1915 | Boerries . |
| 1,526,882 | 2/1925 | Trimmer . |
| 2,110,701 | 3/1938 | Farmer ................................. 248/610 |
| 2,496,710 | 2/1950 | Goddard ........................ 248/610 X |
| 3,155,361 | 11/1964 | Balan . |
| 3,261,422 | 7/1966 | Jensen ............................. 248/634 X |
| 3,455,525 | 7/1969 | Waerm . |
| 4,429,743 | 2/1984 | Bodine ................................. 248/610 |
| 4,667,920 | 5/1987 | Kleineberg .......................... 248/638 |

FOREIGN PATENT DOCUMENTS

| | | | |
|---|---|---|---|
| 50180 | 10/1939 | France ................................ 248/634 |
| 507698 | 12/1954 | Italy ................................... 248/610 |

Primary Examiner—J. Franklin Foss
Attorney, Agent, or Firm—Merchant Gould Smith Edell Welter & Schmidt

[57] ABSTRACT

An apparatus as a secondary vibration isolation system for use in mounting a mechanism having a vibrating element, a housing and a primary vibration isolation system to a separate structure. The apparatus is comprised of a hanging element attached to the separate structure, a secondary vibration isolator for dampening the vibration transmitted from the mechanism to the separate structure, and a securing element to secure the mechanism to the hanging element so that the secondary vibration isolator is positioned between the mechanism and the hanging element.

15 Claims, 4 Drawing Sheets

SECONDARY VIBRATION ISOLATION SYSTEM

Field of Invention

The present invention relates to vibration isolation systems and more particularly to a secondary vibration isolation system for use with a mechanism that contains a primary isolation system.

BACKGROUND OF INVENTION

Numerous mechanisms exist which produce vibrations during use, such as electrical generators and engines. It is often desirable to mount such mechanisms to a non-vibrating structure. Therefore, many of these mechanisms contain a system for isolating the vibration of the mechanism from the structure. One such system can be found in U.S. Pat. No. 07/601,255. Unfortunately, these primary vibration isolation systems do not eliminate all of the vibration from the mechanism.

An additional problem can arise when mechanisms like electrical generators and engines are mounted on mobile vehicles such as motorhomes, ambulances or the like. In these applications, the movement of the vehicle and forces exerted on the vehicle from rough road surfaces can create forces up to 4-G's on the mechanism. Therefore, the mechanism must be securely fastened to the structure to prevent unsafe levels of movement Or the possible loss of the mechanism if the mechanism is to be mounted on the outside of the vehicle. Typically, a mechanism would be bolted or anchored in some other way to the vehicle to eliminate any movement. Unfortunately, this method of attachment fails to provide any dampening of the vibrations emitted from the mechanism.

Therefore, there arises a need for a secondary vibration isolation system that can absorb vibratory forces from a mechanism with a primary vibration isolation system that can also withstand the forces that are incurred when the mechanism is used in a mobile application.

SUMMARY OF INVENTION

The present invention is designed to absorb vibratory forces that are emitted from a mechanism with a primary vibration isolation system. This mechanism can be an electric generator, engine or other mechanism which produces undesirable vibrations in performing its desired function. The present invention is also designed to withstand the forces that will be exerted on the system when the mechanism is utilized for a mobile application.

The present invention includes a reinforcing structure arranged and configured to be attached to the mechanism, a hanging means attached to the non-vibrating structure, a secondary vibration isolator for dampening the vibrations transmitted from the mechanism to the reinforcing structure, and a securing means for securing the reinforcing structure to the hanging means whereby the secondary vibration isolator is positioned between the reinforcing structure and the hanging means. When configured in this way, the dampening means absorbs the vibratory forces and withstands the forces caused by the movement of the non-vibrating structure in a shear direction.

The present invention is further explained hereinafter with more particularity and by reference to the preferred embodiment shown in the following drawings.

DETAILED DESCRIPTION OF THE PREFERRED EMBODIMENT

Figure 1:
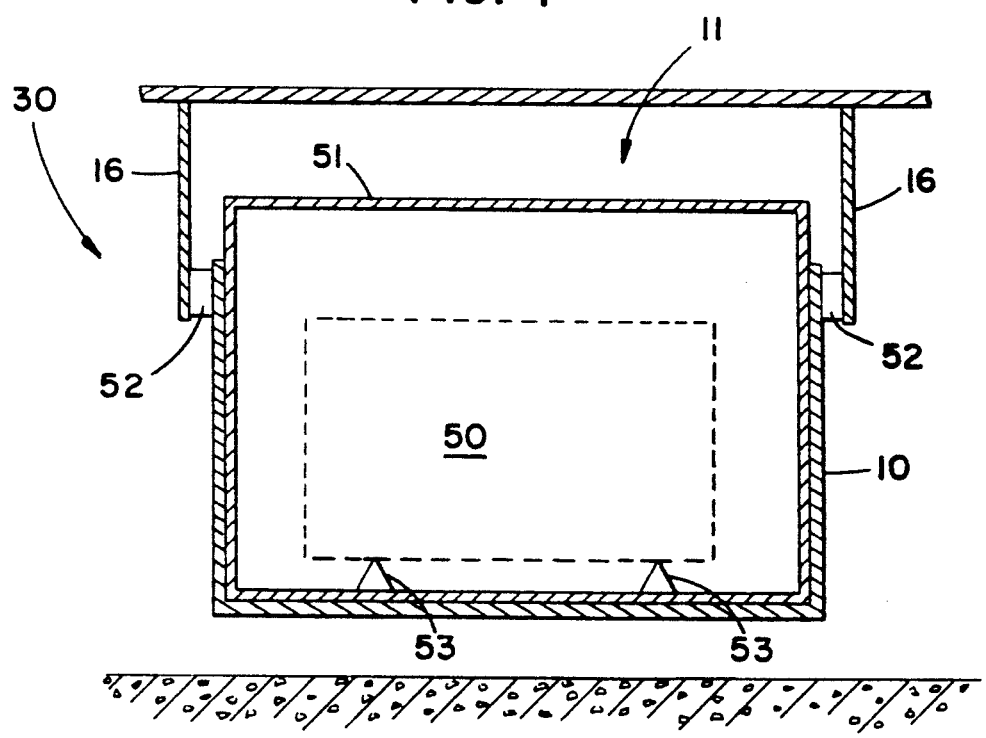
FIG. 1 is a diagrammatical illustration of one embodiment of the invention.

Referring to the drawings wherein like numerals designate like parts, the preferred embodiment of the invention is a secondary vibration isolation system, generally designated as 30, for use with a mechanism 11 having a vibrating element 50, a housing 51 and a primary vibration isolation system 53, FIG. 1. For clarity purposes only, the preferred embodiment of the invention will be described as it would be used to mount an Onan ® Microlite TM 4000 generator set to the bottom of a motorhome floor 25. Those skilled in the art would recognize that the invention could be used for mounting other types of mechanisms to either fixed or mobile mounts.

Figure 2:
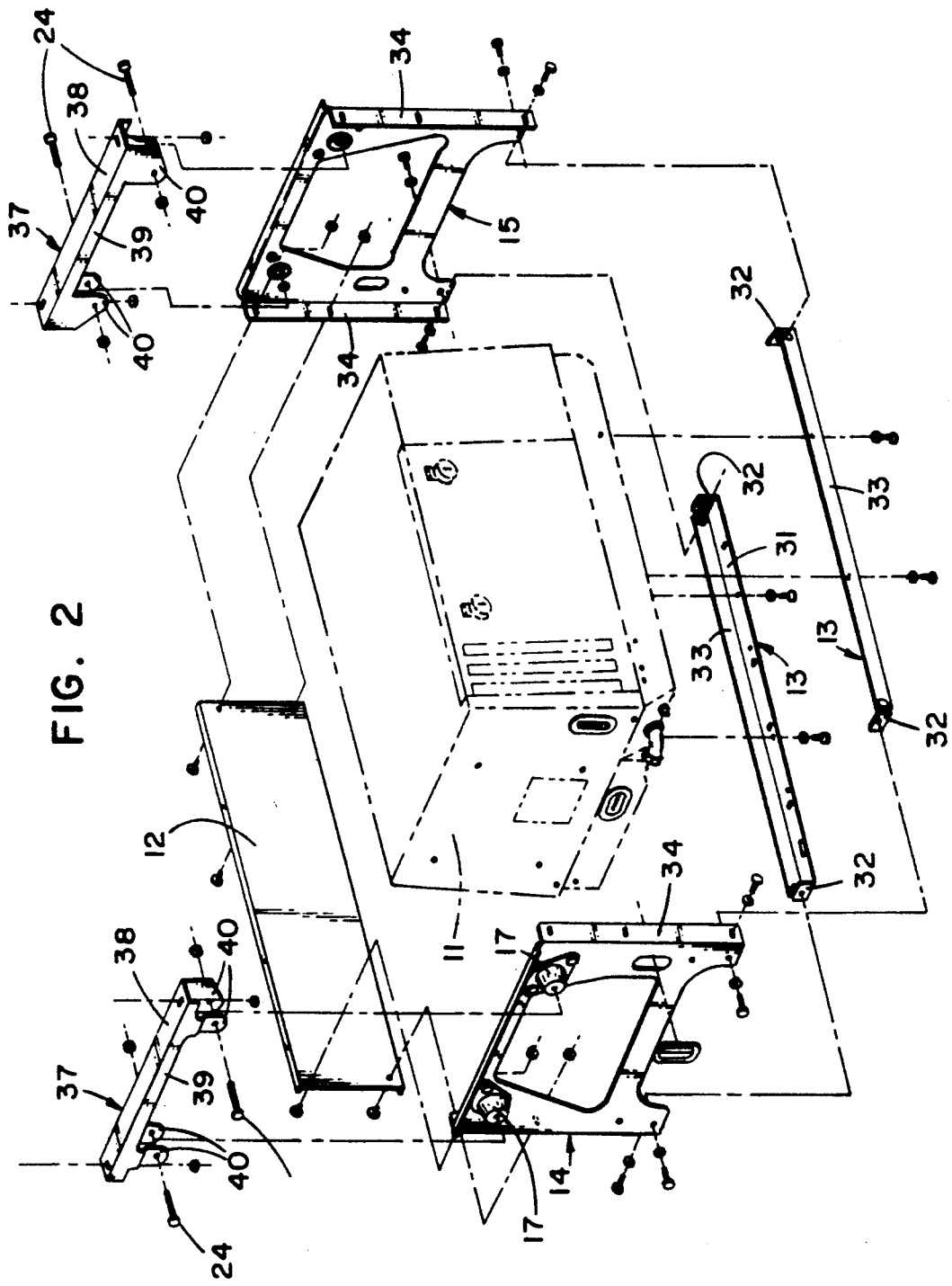
FIG. 2 is an exploded view of the preferred embodiment of the invention for use with an electrical generator.
Figure 3:
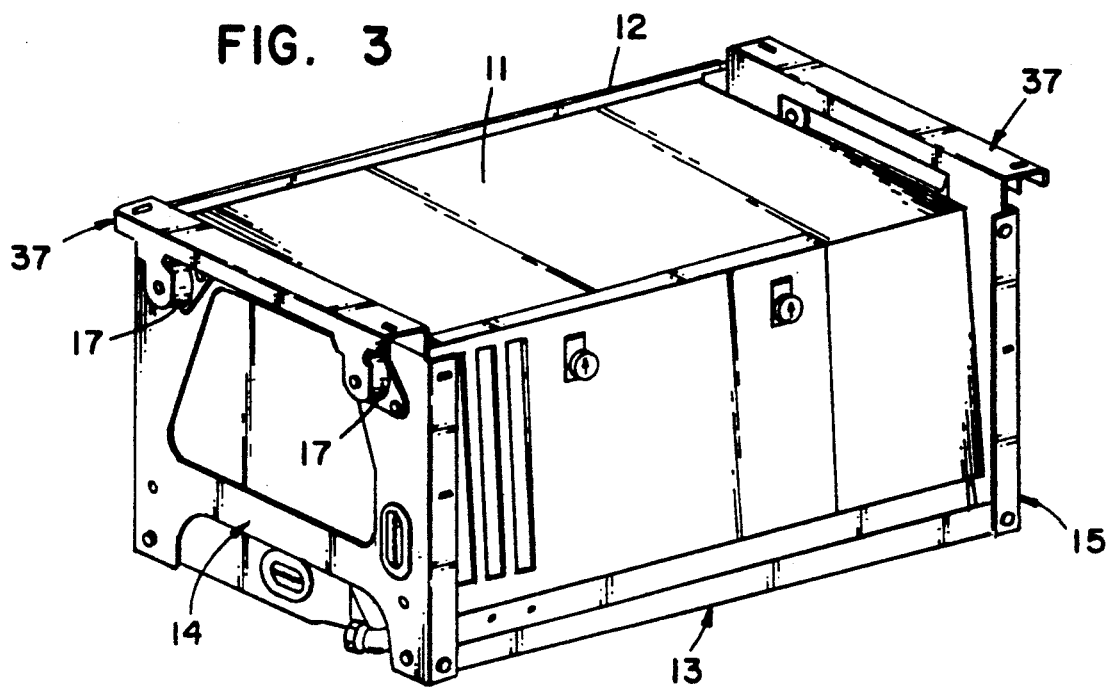
FIG. 3 is a perspective view of the preferred embodiment of the invention as applied to an electrical generator.

Referring now to FIGS. 1 through 3, the preferred embodiment includes a reinforcing structure, generally designated as 10, a hanging means 16, and secondary vibration isolator 52. The reinforcing structure 10 is attached to the housing 51 and enables the generator 11 to be suspended above the ground (see FIG. 1). Those skilled in the art would recognize that most housings 51 are made of a thin sheet steel and would be unable to withstand the forces exerted on the generator 11 without some type of reinforcing structure 10. If the housing 51 could withstand the forces exerted on the generator 11, a separate reinforcing structure 10 would not be required. However, a separate reinforcing structure 10 is advantageous because it can be arranged and configured to be used with several different generators 11. The use of a reinforcing structure 10 also acts to stiffen the secondary vibration system 30 to reduce the movement of the generator 11 relative to the hanging means 16. Therefore, a separate reinforcing structure 10 is used in the preferred embodiment.

The reinforcing structure 10, best shown in FIG. 2, includes two rails 13, a first side panel 14, a second side panel 15, and a back panel 12. In the preferred embodiment, the rails 13 are made of ten gauge sheet steel formed into an elongated L-shape with a length approximately two inches longer than the length of the generator 11. At each end of the rails 13, the base 31 is bent upward to form a bent portion 32 with a height generally equal to the height of the vertical portion 33 of the rail 13. Two apertures are located at each end of the rails 13, one in the vertical portion 33 and one in the bent portion 32. Apertures are also located along the base 31 of the rail 13 that are arranged and configured to allow the insertion of threaded fasteners for connecting the rails 13 to the bottom of the generator 11.

The back panel 12 is formed of sixteen gauge sheet steel and is sized to have a length generally equal to the length of the rails 13. The height of the back panel 12 is sized to be less than the height of the side panels 14, 15. Four apertures are located in the back panel 12, one aperture generally located in each corner of the back panel 12, to allow the insertion of threaded fasteners to enable the back panel 12 to be attached to the side panels 14, 15.

In the preferred embodiment, the first side panel 14 and second side panel 15 would be identical to allow for interchangeability of parts. The end panels 14, 15 are ten gauge sheet steel formed into a plate with portions bent perpendicular to the face of the end panels 14, 15 to form terminal flanges 34 extending at a ninety degree angle to the face of the end panels 14, 15. The end panels 14, 15 are sized to be generally equal in height to the height of the generator 11 and generally equal in length to the width of the generator 11. Portions of the side panels 14,15 are also cut away to allow access to generator 11 panels or for the attachment of generator 11 accessories. The side panels 14, 15 also contain apertures in the lower corners of the face of the end panels 14, 15 and the terminal flanges 34 that are arranged and configured to align with the apertures in the rails 13 and back panel 12.

As best shown in FIG. 3, this type of reinforcing structure 10 provides a secure structure for mounting the generator 11 and also acts to limit the movement of the generator 11 relative to the hanging brackets 37. The rails 13 are attached to the bottom of the generator 11 and to the lower corners of the side panels 14, 15 providing stiffness to the lower part of the reinforcing structure 10. The attachment of the back panel 12 provides stiffness to the upper portion of the reinforcing structure 10. This stiffness acts to reduce axial and twisting type movements of the generator 11 relative to the hanging bracket 37, thereby reducing the compression forces that could be exerted on the dampers 17.

In the preferred embodiment, the secondary vibration isolators 52 are comprised of two dampers 17 attached to each side panel 14,15, one damper 17 generally located in each upper corner of each side panel 14, 15. Those skilled in the art would recognize that the dampers 17 could be mounted in different locations on the reinforcing structure 10. However, during testing it was discovered that mounting the dampers 17 on the side panels 14, 15 above the centerline of the generator 11 provided the best dampening effect.

Figure 4:
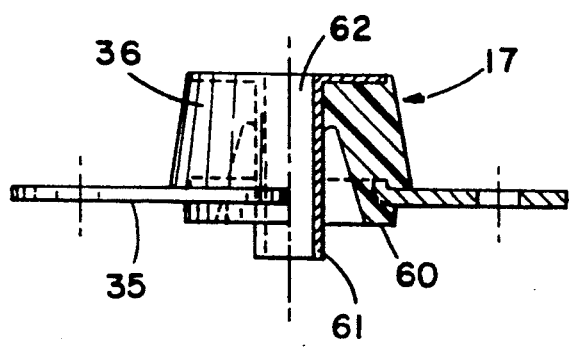
FIG. 4 is a cross-sectional view of an elastomeric damper means with portions cut away.

The dampers 17, best shown in FIG. 4, are made of an elastomeric material, such as neoprene rubber, to allow for the deflection of the damper 17 to reduce the vibration emitted by the generator 11. However, the dampers 17 must be arranged and configured to withstand the forces that are exerted during mobil and fixed applications. If the generator 11 is mounted to a fixed object, the forces on the damper 17 would be a shear force equal to the gravitational force on the generator 11 (1-G) or 168 pounds for the Onan ® Microlite= 4000 generator. If the generator 11 is mounted on a vehicle, the dampers 17 must be arranged and configured to withstand forces resulting from the weight of the generator 11 and road input.

Testing on the mounting of a generator 11 under a motorhome floor 25 indicates that several different forces are transmitted to the dampers 17. First, shear forces up to 4-G's can be transmitted to the dampers 17 in the vertical direction when the motorhome encounters rough roads or bumps. Second, horizontal forces of up to 1-G are transmitted to the dampers 17 during breaking, acceleration or cornering. These forces can act on the dampers 17 in both shear and compression directions. Third, vibrational forces from the generator 11 act in a direction that tends to rock the generator 11 along on axis between the hanging brackets 37. While these forces are much smaller than the road input forces, they are still undesirable to the motorhome occupants if not eliminated by the dampers 17.

Therefore, the dampers 17 are arranged and configured to have a shear stiffness sufficient to withstand a 5-G shear force to enable the damper 17 to withstand the forces that could be exerted on the damper 17 when the generator 11 is mounted on a mobile vehicle. Those skilled in the art would recognize that other types of vibration isolators 52 or combinations of vibration isolators 52 with a spring rate in the horizontal and vertical directions and a 5-G shear strength could be used with the preferred embodiment.

As illustrated in FIG. 4, the damper 17 is comprised of a base portion 35 and an extended portion 36 and back portion 60 that are generally centrally located on the base portion 35. The base portion 35 contains two apertures that are arranged and configured for inserting fasteners to attach the dampers 17 to the side panels 14, 15. The extended portion 36 is frusta-conical in shape with a generally centrally located aperture 62 arranged and configured for the insertion of a securing fastener 24 that extends through the extended portion 36 and back portion 60.

The back portion 60 is generally cylindrical in shape with a thickness generally equal to the thickness of the side panels 14, 15. The diameter of the back portion 60 is sized to be equal to the diameter of corresponding apertures in the upper corners of the side panels 14,15. The back portion 60 also has a fastener extension 61 that increases the length of the centrally located aperture 62 to add additional support to the securing fastener 24.

Figure 5:
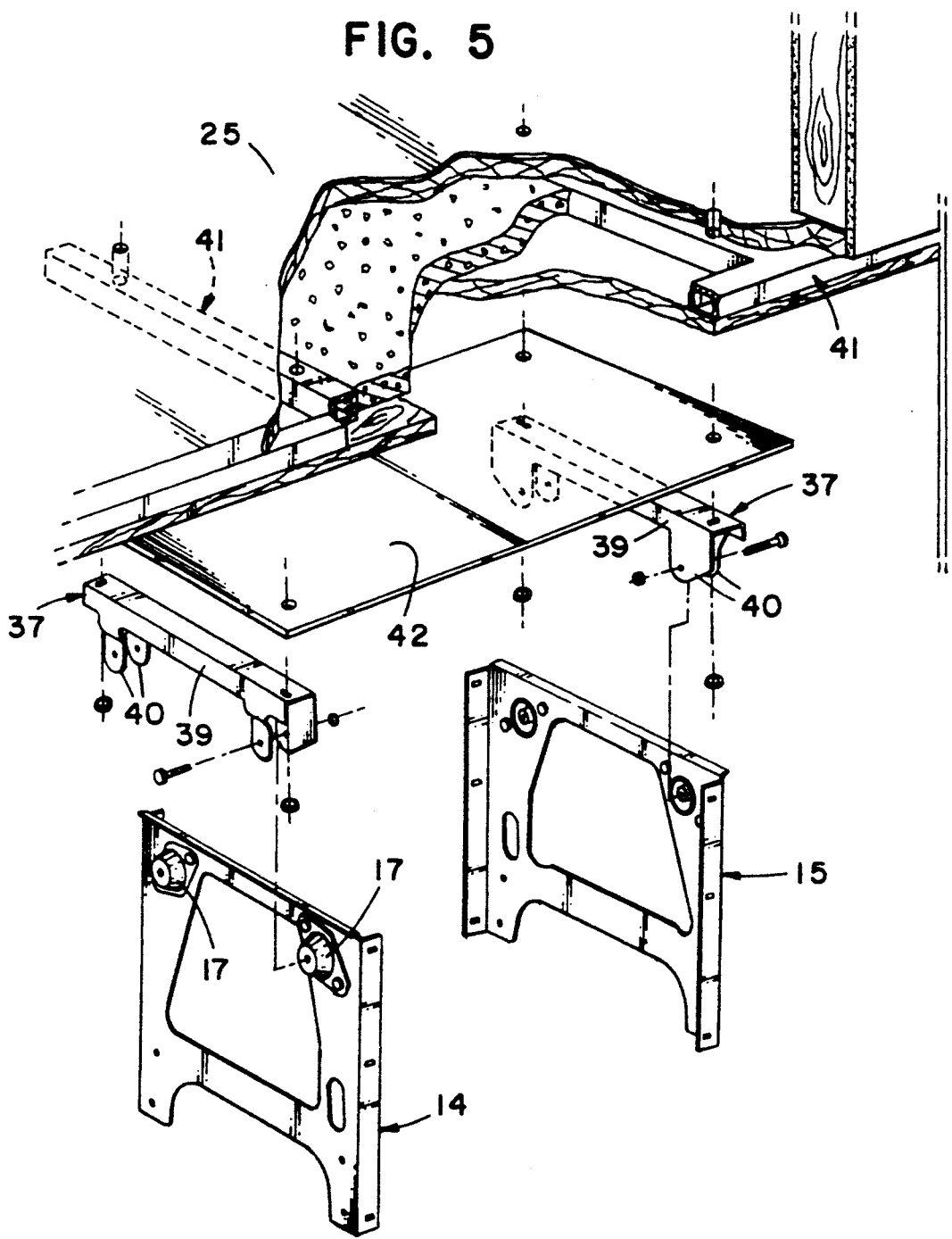
FIG. 5 is an exploded view of the preferred embodiment of the invention for attaching an electric generator under the floor of the motor home.

Referring now to FIGS. 1, 2 and 5, the hanging means 16 in the preferred embodiment consists of two hanging brackets 37. The hanging brackets 37 are ten gauge sheet steel formed into an elongated U-shaped channel member with a length generally equal to the width of the generator 11. Two apertures are located in the bottom portion 38 of the hanging bracket 37 that are arranged and configured to allow the insertion of fasteners to secure the hanging bracket 37 to the motorhome floor 25. The width between the leg portions 39 of the hanging bracket 37 is generally equal to the thickness of the damper 17. The leg portions 39 of the hanging bracket 37 also have extensions 40 with apertures that are arranged and configured to align with the aperture in the dampers 17. Those skilled in the art would recognize that other hanging means 16 could be used to suspend the mechanism 11 from either a fixed surface above the mechanism 11, or from a fixed surface located below the mechanism 11.

Referring now to FIG. 5, the preferred method of mounting the generator 11 to the bottom of a motorhome floor 25 begins by securing the hanging brackets 37 to the steel support frame 41 of the motorhome floor 25. If the motorhome floor 25 is made of wood, a metal plate 42 would be installed between the hanging brackets 37 and the motorhome floor 25. Threaded fasteners are inserted through corresponding apertures in the motorhome floor 25, the steel support frame 41, the metal plate 42 and the hanging brackets 37 to secure the hanging bracket 37 to the motorhome floor 25.

The side panels 14, 15 are then inserted between the leg portions 39 of the hanging bracket 37 so that the apertures in the leg extensions 40 align with the aperture in the dampers 17. Threaded securing fasteners 24 are then inserted through the aligned apertures to secure the side panels 14, 15 to the hanging brackets 37. The attachment of the side panels 14, 15 in this fashion positions the dampers 17 between the hanging brackets 37 and the side panels 14, 15. Therefore, the vibrations from the generator 11 and the forces exerted on the generator 11 are absorbed by the dampers 17 instead of being transferred to the motorhome floor 25. The insertion of the securing fasteners 24 in this fashion also creates a fail safe configuration. If the damper 17 were to fail, the securing fastener 24 would continue to support the generator 11 because the securing fastener 24 extends through the hanging bracket 37 and side panels 14, 15.

As best shown in FIG. 2, the apertures in the back panel 12 are then aligned with the apertures in the side panel terminal flanges 34 and threaded fasteners are used to secure the back panel 12 to the side panels 14, 15. The generator 11 is then raised off the ground and the rails 13 are secured to the bottom of the generator 11 by threaded fasteners. A jack or some other lifting device is then used to raise the generator 11 until the apertures in the rails 13 align with the corresponding apertures in the side panels 14, 15. Threaded fasteners are then used to attach the rails 13 to the side panels 14, 15 completing the mounting of the generator 11.

Although characteristics and advantages together with details for structure, materials, function and process steps have been described in reference to a preferred embodiment herein, it is understood that the disclosure is illustrative. To that degree, various changes made, especially to the matters of shape, size and arrangement, to the full extent extended by the general meaning of the terms in which the appended claims are expressed, are within the principles of the present invention.

What is claimed:

1. A secondary vibration isolation system for use in mounting a mechanism having a vibrating element, a housing and a primary vibration isolation system, which isolates the vibrating element from the housing, to a separate structure, the secondary vibration isolation system comprising:
   a) a reinforcing structure arranged and configured to be attached to the mechanism having two side panels and at least one elongate member connected to and between said side panels;
   b) hanging means for attaching the mechanism to a separate structure so that the mechanism is suspended off the ground or floor;
   c) a secondary vibration isolator for dampening the vibration transmitted from the mechanism housing to the separate structure; and
   d) securing means for securing the mechanism to the hanging means whereby the secondary vibration isolator is positioned between the hanging means and the reinforcing structure.

2. A secondary vibration isolation system as in claim 1 wherein the reinforcing structure comprises two rails having first and second ends that are arranged and configured for attachment to the bottom of the mechanism housing and that are generally longer in length than the length of the mechanism housing; a first and a second side panel arranged and configured to have a width and height generally equal to the width and height of the mechanism housing; a back panel with first and second ends generally equal in length to the length of the rails; a means for securing the first and second ends of the rails to the first and second end panels respectively, and means for securing the first and second ends of the back panel to the first and second end panels respectively.

3. A secondary vibration isolation system as in claim 1 wherein the hanging means comprises two U-shaped channel members with a length generally less than the width of the mechanism, having a bottom portion and two leg portions wherein the distance between the two leg portions is generally equal to the height of the secondary vibration isolator.

4. A secondary vibration isolation system as in claim 1, wherein the secondary vibration isolator comprises several elastomeric isolators attached to the reinforcing structure.

5. A secondary vibration isolation system as in claim 1, wherein the securing means comprises several threaded fasteners.

6. A secondary vibration isolation system for use in mounting a mechanism having a vibrating element, a housing and a primary vibration isolation system, which isolates the vibrating element from the housing, to a separate structure, the secondary vibration isolation system comprising:
   a) two rails having first and second ends that are arranged and configured for attachment to the bottom of the mechanism and that are generally longer in length than the length of the mechanism;
   b) a first and a second side panel arranged and configured to have a width and height generally equal to the width and height of the mechanism;
   c) a back panel with first and second ends generally equal in length to the length of the rails;
   d) means for securing the first end of the rails and the first end of the back panel to the first side panel;
   e) means for securing the second end of the rails and the second end of the back panel to the second end panel;
   f) means for securing the rails to the mechanism;
   g) hanging means attached to the separate structure;
   h) means for dampening the vibration transmitted to the first and second side panels from the mechanism housing; and
   i) means for securing the first and second side panels to the hanging means whereby the means for dampening the vibration is positioned between the first and second side panels and the hanging means.

7. A secondary vibration isolation system as in claim 6, wherein the means for dampening the vibration comprises several frusta-conical elastomeric isolators generally located on the outer surface of the first and second side panels.

8. A secondary vibration isolation system as in claim 7, wherein the isolators are generally located near the 9. A secondary vibration isolation system as in claim 6, wherein the hanging means comprises two U-shaped channel members with a length generally less than the width of the mechanism having a bottom portion and two leg portions wherein the distance between the two leg portions is generally equal to the height of the means for dampening the vibration transmitted from the mechanism housing.

10. A secondary vibration isolation system as in claim 6, wherein the means for securing the first and second side panels to the hanging means comprises several threaded fasteners that extend through both the hanging means and the dampening means.

11. A secondary vibration isolation system as in claim 6, wherein the means for securing the rails and back panel to the first side panel comprises several threaded fasteners.

12. A secondary vibration isolation system as in claim 6, wherein the means for securing the rails and back panel to the second side panel comprises several threaded fasteners.

13. A secondary vibration isolation system as in claim 6, wherein the means for securing the rails to the mechanism comprises several threaded fasteners.

14. A secondary vibration isolation system for use in mounting a mechanism having a vibrating element, a housing and a primary vibration isolation system, which isolates the vibrating element from the housing, to a separate structure, the secondary vibration isolation system comprising:
   a) hanging means for suspending the mechanism off the ground or floor;
   b) A reinforcing structure attached to the mechanism having two side panels and at least one elongate member connected to and between said side panels; and
   c) a secondary vibration isolator attached to and positioned between the hanging means and the mechanism housing, whereby the vibration transmitted from the housing to the hanging means and forces exerted on the suspended mechanism act on the secondary vibration isolators.

15. A secondary vibration isolation system as in claim 14, wherein the secondary vibration isolator comprises several frusta-conical elastomeric isolators.

* * * * *

UNITED STATES PATENT AND TRADEMARK OFFICE
CERTIFICATE OF CORRECTION

PATENT NO. : 5,240,222

DATED : August 31, 1993

INVENTOR(S) : Seeley et al.

It is certified that error appears in the above-identified patent and that said Letters Patent is hereby corrected as shown below:

Column 1, line 18, "07/601,255" should read --5,096,153--.

Column 6, line 57, insert --upper edge of the outer surface of the first and second side panels.-- after the word "the".

Signed and Sealed this

Fourth Day of April, 1995

Attest:

BRUCE LEHMAN

*Attesting Officer*  *Commissioner of Patents and Trademarks*